A. S. LYHNE.
PORTABLE ELECTRIC LAMP.
APPLICATION FILED AUG. 7, 1914.
1,122,778.
Patented Dec. 29, 1914.
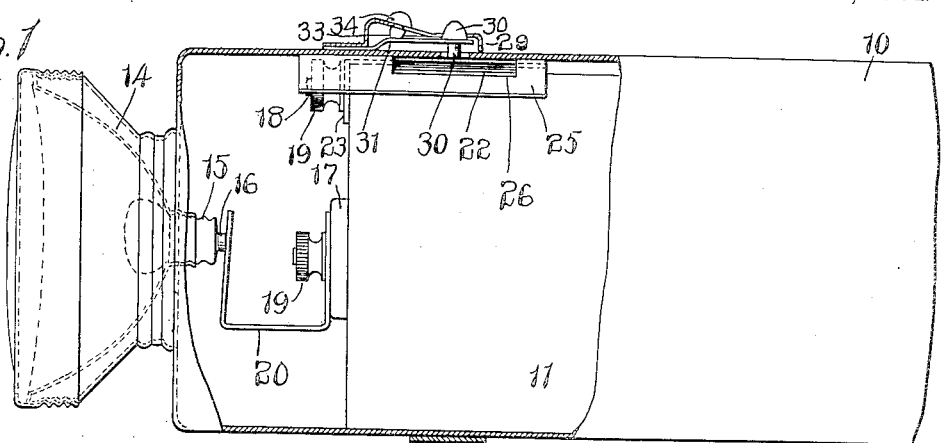
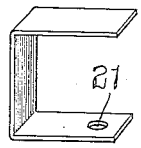
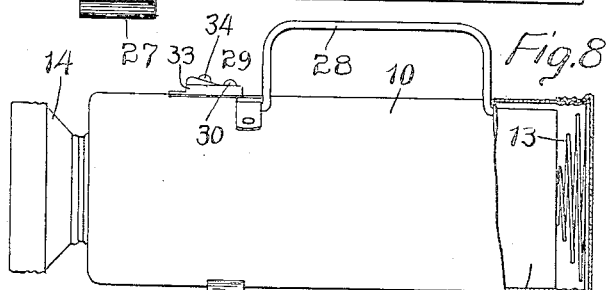
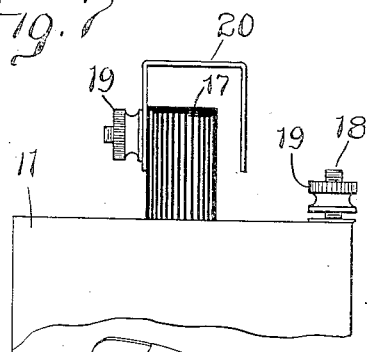
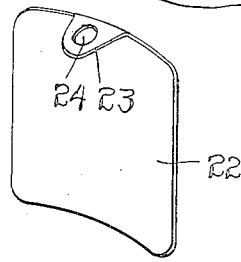
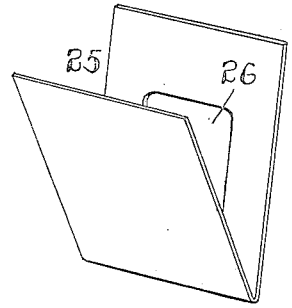
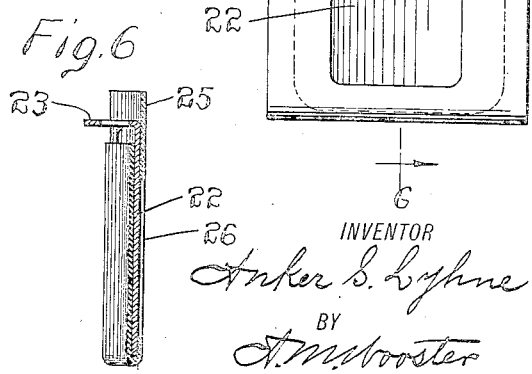
WITNESSES:
H. W. Meade
E. M. Culver
INVENTOR
Anker S. Lyhne
BY
H. M. Wooster
ATTORNEY

UNITED STATES PATENT OFFICE.

ANKER S. LYHNE, OF BRIDGEPORT, CONNECTICUT.

PORTABLE ELECTRIC LAMP.

1,122,778.  Specification of Letters Patent.  Patented Dec. 29, 1914.

Application filed August 7, 1914. Serial No. 855,615.

*To all whom it may concern:*

Be it known that I, ANKER S. LYHNE, a citizen of the United States, residing at Bridgeport, county of Fairfield, State of Connecticut, have invented an Improvement in Portable Electric Lamps, of which the following is a specification.

This invention relates to portable electric lights and has for its object to provide a case and suitable electrical connections adapted to coöperate with the ordinary dry cell of commerce, thus doing away with the requirement for specially made batteries.

In the accompanying drawing forming a part of this specification, Figure 1 is a view partly in elevation and partly in longitudinal section, illustrating the application of my novel case and connections to an ordinary dry cell of commerce; Fig. 2 a perspective view of the positive pole connection detached; Fig. 3 a perspective view of the negative pole connection detached; Fig. 4 a perspective view of an insulating cover for a negative pole connection detached; Fig. 5 an elvation of the negative pole connection and its insulating cover assembled; Fig. 6 a section on the line 6—6 in Fig. 5, looking in the direction of the arrows; Fig. 7 an elevation illustrating the application of the positive pole connection to another type of commercial dry cell, and Fig. 8 is an elevation on a reduced scale partly broken away to show the spring of the lamp complete as in use.

10 denotes a tubular case made of sheet metal and open at its lower end to receive an ordinary commercial dry cell indicated by 11. The lower end of the case is closed by a screw cap 12 which carries a coil spring 13, the action of which is to raise the cell and retain it in operative position. At the upper end of the case is a reflector 14 within which is an ordinary lamp 15, the center contact of which is indicated by 16.

17 denotes the positive pole and 18 the negative pole of the cell, each provided with a binding screw 19.

20 denotes the positive pole contact which is simply a U-shaped piece of spring metal, one of the arms being provided with a hole 21 to receive the usual threaded shank of the positive pole upon which it is retained by the binding screw either as in Fig. 1 or in Fig. 7, the only difference being that in one form an arm of the positive pole contact engages the center contact of the lamp and in the other form the base of the positive pole contact engages the center contact of the lamp.

22 denotes the negative pole contact which is simply a concavo-convex plate of sheet metal provided with an ear 23 lying at a right angle to the plate and provided with a hole 24 to receive the threaded shank of the negative pole contact upon which it is retained by the binding screw.

25 denotes an insulating cover for the negative pole contact which may be a sheet of card board or any suitable insulating material and is adapted to be folded about the contact and is provided with an opening 26 through which the contact is exposed.

The case is preferably provided with legs 27 upon which it may rest and with handles 28 for convenience in use.

Electrical connection is made by means of a suitable circuit closer indicated as a whole by 29. In the present instance I have shown a circuit closer comprising a contact pin 30 carried by a spring 31 and provided with a head 32 for convenience in operation. The spring is secured to the case and is covered by a housing 33 having a slotted incline and a stud 34 passing through the slot and adapted to slide down the incline and bear on the spring to hold the contact pin in engagement with the negative pole contact and retain the circuit closed. For ordinary use contact is made by pressing upon the head of the contact pin. When the circuit is closed the current passes from the positive pole of the cell through the positive pole contact to the lamp, from the lamp to the case and through the spring and contact pin to the negative pole contact. In assembling, the binding screws are removed and the positive and negative pole contacts are attached to the dry cell as described and secured there by replacing the binding screws. It will be noted that the negative pole contact and its insulating cover are curved to correspond with the curvature of the cell and the case and lie between them when assembled. Having placed the dry cell in the case it is retained there by turning on the screw cap.

Having thus described my invention I claim:

1. The combination with a dry cell having positive and negative poles with binding posts and nuts, of contacts adapted to be secured to the poles by the nuts, a case adapted to receive the cell, a lamp carried by the case and adapted to engage the positive pole contact and means upon the case for making electrical connection with the negative pole contact.

2. The combination with a dry cell having positive and negative poles, a case therefor and a lamp carried by the case, of a removable positive pole contact adapted to engage the lamp, a removable negative pole contact, means for attaching said contacts to the poles, and means upon the case for making electrical connection with the negative pole contact.

3. The combination with a dry cell having positive and negative poles, a case therefor and a lamp carried by the case, of a removable positive pole contact adapted to engage the lamp, a removable negative pole contact, means for attaching said contacts to the poles, means for insulating said contact from the case and means upon the case for making electrical connection with said contact.

4. The combination with a dry cell having positive and negative poles, a case therefor and a lamp carried by the case, of a U-shaped spring contact adapted for attachment to the positive pole and to engage the lamp, a removable negative pole contact insulated from the case, means for attaching said contact to the pole, and a spring-controlled push pin on the case adapted to engage the negative pole contact.

5. The combination with a dry cell having positive and negative poles, a case therefor and a lamp carried by the case, of a spring contact detachably secured to the positive pole and adapted to engage a lamp, a contact plate detachably secured to the negative pole and adapted to lie between the case and the cell, insulation for said plate provided with an opening and circuit closing means upon the case.

In testimony whereof I affix my signature in presence of two witnesses.

ANKER S. LYHNE.

Witnesses:
H. W. MEADE.
E. M. CULVER.